United States Patent
Alpert et al.

(10) Patent No.: US 8,588,783 B2
(45) Date of Patent: Nov. 19, 2013

(54) POWER CONTROL IN WIRELESS COMMUNICATIONS NETWORKS DURING HAND-OVER

(75) Inventors: Yaron Alpert, Hod Hasharon (IL); Sami Shechter, Rishon Le-Zion (IL)

(73) Assignee: Alvarion Ltd., Tel-Aviv (IL)

( * ) Notice: Subject to any disclaimer, the term of this patent is extended or adjusted under 35 U.S.C. 154(b) by 439 days.

(21) Appl. No.: 12/067,244

(22) PCT Filed: Jun. 21, 2006

(86) PCT No.: PCT/IL2006/000715
§ 371 (c)(1),
(2), (4) Date: May 19, 2008

(87) PCT Pub. No.: WO2007/031982
PCT Pub. Date: Mar. 22, 2007

(65) Prior Publication Data
US 2008/0254820 A1    Oct. 16, 2008

(30) Foreign Application Priority Data
Sep. 18, 2005 (IL) .................................. 170925

(51) Int. Cl.
*H04W 36/00* (2009.01)
*H04B 7/00* (2006.01)
*H04W 4/00* (2009.01)

(52) U.S. Cl.
USPC ............ 455/437; 455/436; 455/522; 370/331

(58) Field of Classification Search
None
See application file for complete search history.

(56) References Cited

U.S. PATENT DOCUMENTS

| | | | |
|---|---|---|---|
| 5,818,871 A | 10/1998 | Blakeney, II | |
| 5,862,489 A * | 1/1999 | Aalto | 455/522 |
| 6,128,493 A * | 10/2000 | Song | 455/436 |
| 6,345,183 B1 * | 2/2002 | Silventoinen et al. | 455/422.1 |
| 6,449,489 B1 * | 9/2002 | Lu et al. | 455/506 |
| 6,850,504 B1 | 2/2005 | Cao et al. | |
| 2001/0001762 A1 * | 5/2001 | Frodigh et al. | 455/436 |
| 2002/0077138 A1 * | 6/2002 | Bark et al. | 455/522 |
| 2002/0077140 A1 * | 6/2002 | Monogioudis et al. | 455/522 |
| 2004/0043769 A1 * | 3/2004 | Amerga et al. | 455/437 |
| 2004/0128095 A1 * | 7/2004 | Oestreich | 702/89 |
| 2004/0166888 A1 * | 8/2004 | Ahn et al. | 455/522 |
| 2005/0118993 A1 | 6/2005 | Roux et al. | |

FOREIGN PATENT DOCUMENTS

EP    0 883 251 A2    12/1998
EP       883251 A2 *  12/1998 ............ H04B 7/005

* cited by examiner

*Primary Examiner* — Yuwen Pan
*Assistant Examiner* — Ayodeji Ayotunde
(74) *Attorney, Agent, or Firm* — Browdy and Neimark, PLLC

(57) ABSTRACT

A method and devices are provided for adapting the transmission power level of a mobile terminal during a handover phase at which the mobile terminal switches from one base station to another. The method provided comprises applying values of operating parameters that characterize both base stations and adapting the transmission power level to an acceptable level at which communications transmitted from the terminal to the second station would be properly received without applying further increase in the transmission power while ensuring that the communications transmitted by the mobile terminal to the second base station, will not cause severe interference to communications exchanged between the second base station and the other terminals communicating therewith.

7 Claims, 3 Drawing Sheets

POWER CONTROL IN WIRELESS COMMUNICATIONS NETWORKS DURING HAND-OVER

FIELD OF THE INVENTION

The present invention relates generally to wireless communications, and in particular, to cellular wireless communication networks carrying out handover process.

BACKGROUND OF THE INVENTION

In modern multiple access systems, alternate and TX noise floor interferences generated by adjacent Terminal Stations (TS's) is one of the most significant factors in utilizing the system capacity and in affecting session quality. One common way to overcome this problem is to reduce the transmit power for each user so that the interference is eliminated or at least limited. However, it is obvious that the transmit power cannot be simply reduced without taking into considerations other factors such as that the reduced power should still be enough in order to maintain the required performances for a satisfactory traffic quality.

Two approaches are known in the art for carrying out adaptation of the Terminal Station (TS) transmission power when it is about to start transmitting to a Target Base Station (TBS). The first approach is by carrying out a process of pre-association with the target BS before starting the actual transmission process (while maintaining or temporary suspending the communication to SBS). By this approach, the TS would receive information about the link characteristics and/or power setup requirements by connecting to the TBS, and consequently will be able to modify its own power level accordingly. Following the pre-association period, the information is used by the TS to adjust its Tx power level when connecting to the TBS. The main disadvantage of such a method is the increase in the time required for the TS scanning process, causing significant adverse impact (interruption) on the TS active data traffic session with a Serving Base Station during scanning interval. The second approach is by using close loop power control during the preliminary stage of the communication with the TBS. By this approach, the TS sets its initial TX power for transmitting to the TBS according to predefined knowledge of the TBS requirements and/or measurements of transmission(s) received from the TBS. The main disadvantage of this approach is significant delay increase during a handover (HO), a process when a connection has to be transferred from one sector to another while the user moves between cells, during active data traffic session.

US 20030203742 describes wireless devices incorporated in an ad-hoc wireless network which adaptively set their transmission power levels based on locally available information. Initially, each such wireless device sets its transmission power level to a relatively low level, and gradually increases its power level up to a predetermined maximum transmission power level. As the transmission power increases, the wireless device is able to incrementally connect with additional wireless devices located at increasing distances from the wireless device. As the wireless device connects with these additional wireless devices, it checks a connectivity constraint. When the connectivity constraint is satisfied, the wireless device stops increasing its power and operates at its current power level.

US 20050147074 describes a method for autonomously optimizing the transmission power of an endpoint in a wireless network. The method includes monitoring the signal quality associated with data transfers between an access point in the wireless network and the endpoint at a certain transmission power and a certain transmission speed, checking whether the signal quality is acceptable and then adjusting the transmission power or the transmission speed based on whether the signal quality is acceptable.

US 20010012766 discloses a wireless communication apparatus that includes a variable power amplifier and a power amplifier. A variable power amplifier control unit controls the gain of the variable power amplifier for controlling the transmission power. Simultaneously therewith, a detection unit detects changes in conditions of the station and based upon the detected condition changes, a transmission power control bit controlling unit and a transmission power control period controlling unit change the control period of the transmission power control bit and the transmission power control range respectively, and the transmission power control bit is inserted into the transmission signal in be received by the other end of the link receiver.

In addition, one of the processes characterizing a mobile wireless network is a handover (HO) process in which a connection, currently existing between a device and a second device, needs to be transferred to another device during an active communication session. Such as in the case where a user moves from one cell to another cell while surfing the web, or in the midst of a phone call.

The problem with such a handover process is that it should be carried while the TS moves to an area serviced by a second BS and should communicate at the correct transmission power level, i.e. not too low and not too high. Otherwise, if it's transmission power is too low, it will not be received immediately at its first attempt and the handover process might take too long time, while on the other hand, if its transmission power is too high it might cause severe interference to other TSs that are already communicating with the second (target) BS. US 20050159176 describes a radio communication system where an associated-dedicated physical channel used for carrying out a soft hand-over and a high speed-dedicated physical control channel used for carrying out a hard hand-over, are combined.

Still, none of the prior art methods described provide an adequate solution to the problem of carrying out a reliable hand-over process which will be completed within a short enough time interval and will not consume too much resources of the wireless network.

SUMMARY OF THE INVENTION

It is therefore an object of the present invention to provide a novel method for carrying out a fast power adjustment during handover process when changing the base station for communication.

It is another object of the present invention to provide a mobile terminal operative to adjust its power transmission level when moving from an area covered by a first base station to another area covered by another base station.

Other objects of the invention will become apparent as the description of the invention proceeds.

It is therefore provided in accordance with a first embodiment of the invention, in a wireless communications network, comprising a mobile terminal communicating with a first base station, a method for adapting the mobile terminal's transmission power level during a handover process to a second base station. The method comprises applying values of operating parameters which characterize each of the first and said second base stations and adapting the transmission power level of the mobile terminal to an acceptable level in which communications transmitted from the terminal to the second station would be properly received at the second base station preferably without applying further increase in their transmission power, and wherein the communications transmitted by the mobile terminal to that second base station will not cause severe interference to the operation of other terminals being in communication with the second base station.

Preferably, the method comprising the steps of:
(i) storing dynamically updated values of one or more pre-defined parameters associated with the operation of the first base station;
(ii) retrieving values of one or more pre-defined parameters associated with the operation of said second base station, from communications received by said mobile terminal;
(iii) determining a required modification in the transmission power level of the terminal for communicating with the second base station; and
(iv) setting the terminal's transmission power level in accordance with the determination made in step (iii).

As will be appreciated by those skilled in the art, step (ii) of retrieving values of one or more pre-defined parameters associated with the operation of the second base station may be received at the terminal directly from communications transmitted by the second base station and received by the terminal. In addition or and/or in the alternative, such one or more pre-defined parameters that associated with the operation of the second base station, may be received indirectly through communications received at a base station other than the second base station (e.g. through the first base station, or through a third base station).

According to another embodiment of the invention, step (iii) comprises a step of determining whether a modification is required prior to determining the required modification.

By yet another preferred embodiment of the invention, the pre-defined parameters associated with the first base station are one or more members of the group consisting of: power control parameters associated with the first base station and parameters characterizing the status of a communication link extending between the first base station and the terminal.

According to still another preferred embodiment of the invention, the pre-defined parameters associated with the second base station are one or more members of the group consisting of: power control parameters associated with said second base station, parameters characterizing the status of a communication link extending between said second base station and said terminal, and parameters associated with power control offset. As will be appreciated by those skilled in the art, the offset can derive from internal errors experienced by the TS and/or from errors discovered during communications with other base stations.

In accordance with another aspect of the present invention, there is provided a mobile terminal adapted to operate in a wireless network and comprising:
a transceiver adapted to communicate with a base station operative in said wireless network;
a first processor operative to retrieve values of pre-defined parameters associated with communications conducted between the mobile terminal and a first base station;
a storing means adapted to store current values of the pre-defined parameters retrieved by the first processor;
a second processor adapted to retrieve pre-defined values associated with a second base station, with which the mobile terminal is about to start communicating;
a third processor adapted to calculate a transmission power level for communicating with the second base station; and
a control circuitry adapted to set the transmitter power level to the level calculated by the third processor prior to starting communications with said second base station.

Although the above described mobile terminal has been described as comprising three processors, it will be appreciated by those skilled in the art that the functions associated with these three processors could alternatively be carried by using one processor only or by any number of processors, as will be desired by the manufacturer of the mobile terminal.

According to still another aspect of the present invention, there is provided a base station operative in a wireless network and comprising:
a transmitter adapted to transmit a training signal towards a mobile terminal that is about to start communicating with the base station, and wherein the training signal is adapted to provide the mobile terminal with characteristics required to allow the mobile terminal to estimate an allowed power level for transmitting communications to the base station along a certain channel that will be used for that purpose; and
a receiver adapted to receive communications from the mobile terminal.

DETAILED DESCRIPTION OF THE INVENTION

The invention will now be described by way of examples, and without limiting the generality of the foregoing.

According to a preferred embodiment provided by the present invention, a method is provided by which the output power of the transmitter of a Terminal Station (TS) is set to an initial value when the TS, which is currently serviced by a SBS, is about to access a cell serviced by a different TBS.

This initial value of the transmitter's power output is determined by applying a correction factor (CF) to the currently used output power of the TS transmitter that is now transmitting to the SBS. Applying this CF allows determining the initial transmission power that will be used by the TS transmitter upon starting the transmission to the TBS during the HO.

Figure 1:
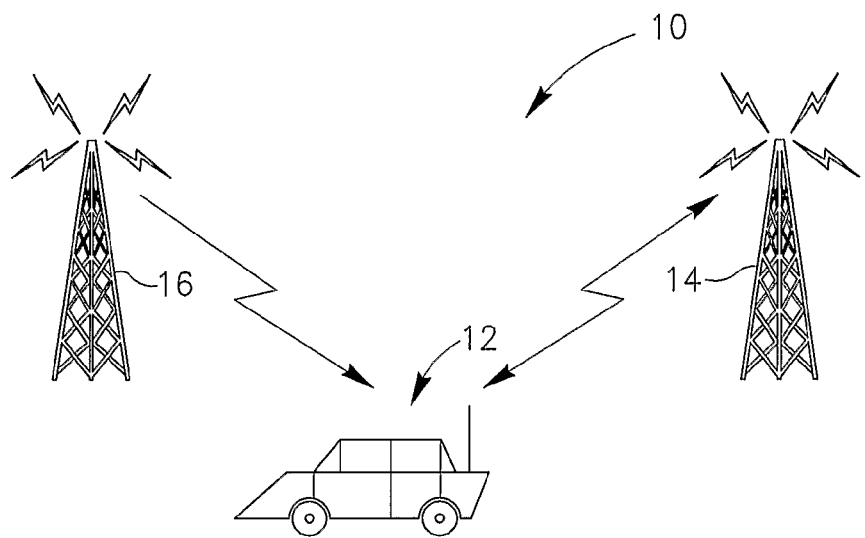
FIG. 1 illustrates a wireless network where a mobile station moves from a cell covered by a first base station to another cell covered by another base station.

Let us consider now a wireless network 10 as illustrated in a schematic way in FIG. 1. Terminal Station 12 is currently moving in an area serviced by SBS 14, while carrying out an active communication session where traffic is conveyed through that base station. During this session, the TS periodically measures one or more pre-defined characterizing parameters of the base station which may be used to adapt its current power transmission to the SBS (if needed), but are also preferably stored in a memory means of TS 12 for later use when TS is about to access the area serviced by TBS 16. When reaching the area when transmissions from TBS 16 may be received by TS 12, one or more pre-defined parameters characterizing that TBS are received by TS 12 and together with the stored parameters which relate to the SBS, the change in the TS output power level is determined. Upon effecting this change (if indeed required) TS 12 will start transmitting to TBS 16 and receive communications therefrom.

Figure 2:
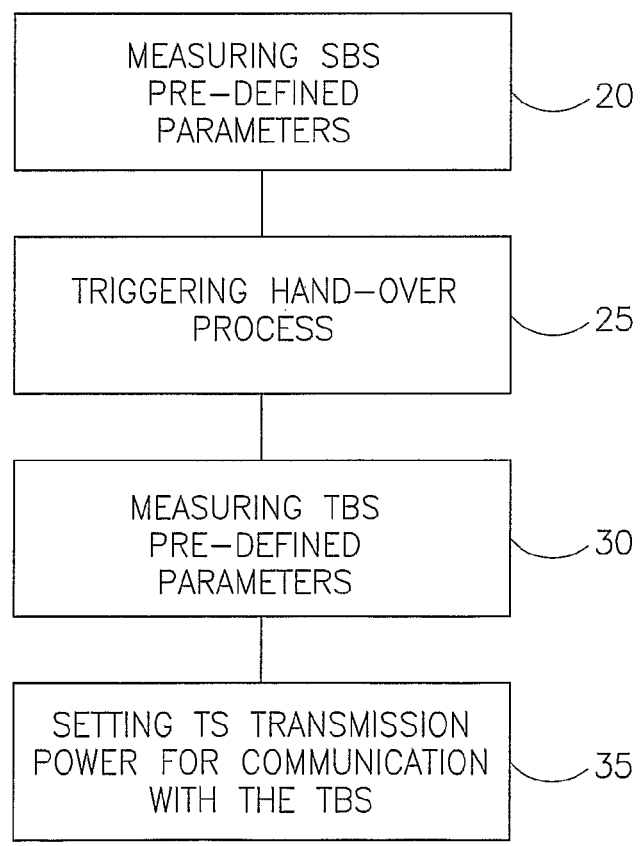
FIG. 2 illustrates a block diagram of a method for carrying out an embodiment of the present invention.

The method provided by the present invention is further described in FIG. 2. The TS acquires, preferably on a periodic basis, one or more pre-defined parameters associated with a BS which is currently communicating with the TS (step 20). These pre-defined parameters are stored at the TS. As will be appreciated by those skilled in the art, this step may be carried by using any one or more methods such as storing the difference from pre-defined values of the pre-defined parameter(s), measuring the parameters on a non-period basis, etc. and all these methods should be considered as encompassed by the present invention for carrying out this step. When the TS approaches an area serviced by another base station, a handover process is triggered (step 25). Next, the new base station, the TBS, transmits certain pre-defined parameters (step 30), and from knowing the values of the pre-defined parameters associated with the old base station and after receiving the values of the pre-defined parameters associated with the new base station (which preferably but not necessarily are the same parameters), the value of the power output level that will suit the conditions for transmission to the new base station is determined (step 35) and the TS will commence communicating with the TBS.

According to an embodiment of the present invention, the handover output power is calculated based on the current output power and an offset therefrom derived from any one or more members of the group consisting of: SBS power control parameters, SBS link status, TBS power control parameters, TBS link status and parameters associated with power control offset (PCoffset).

The determination of the power to be used for the transmission to the new BS, the TBS, is by using the following relationship:

$$P^t_{TBS} = P^t_{SBS} + F_{offset} \quad (1)$$

where $P^t_{TBS}$ is the TS power level (dBm) that will be used for transmission to TBS;

$P^t_{SBS}$ is the currently used TS power level (dBm) for transmission to SBS; and $F_{offset}$ is a correction factor having (dB) dimensions.

The correction factor can be described for example by the following function:

$$F_{offset} = f(P^{sub}_{SBS}, Rx\_RSS_{SBS}, Rx\_SINR_{SBS}, Target\_RSS_{SBS}, Target\_SINR_{SBS}, Target\_NI_{SBS}, P^{sub}_{TBS}, Rx\_RSS_{TBS}, Rx\_SINR_{TBS}, Target\_RSS_{TBS}, Target\_SINR_{TBS}, Target\_NI_{SBS})$$

where

Target_RSS$_{SBS}$ is the SBS uplink target received power criteria, or in other words the strength of a signal transmitted by the TS as received by the SBS, i.e. the SBS Receive Signal Strength ("RSS") expected to be received from the TS;

Target_SINR$_{SBS}$ is the SBS uplink target Signal to Interferences and Noise Ratio ("SINR") criterion;

Target_NI$_{SBS}$ is the SBS uplink target Noise level and Interferences (NI) criterion;

$P^{sub}_{SBS}$—the SBS' transmitter power level;

Rx_RSS$_{SBS}$—the SBS downlink (DL) RSS as measured by the TS;

Rx_SINR$_{SBS}$—the SBS downlink (DL) SINR as measured by the TS;

$P^t_{TBS}$—TS required transmission power level for transmission to the TBS;

Target_RSS$_{TBS}$—TBS uplink target received power criterion, i.e. the SBS target Receive Signal Strength;

Target_SINR$_{TBS}$ is the TBS uplink target Signal to Interferences and Noise Ratio ("SINR") criterion Target_NI$_{TBS}$ is the TBS uplink target Noise level and Interferences (NI) criterion;

$P^{sub}_{TBS}$—TBS transmission power level;

Rx_RSS$_{TBS}$—TBS Received DL RSS as measured by the TS; and

Rx_SINR$_{TBS}$—the TBS downlink (DL) SINR as measured by the TS.

Let us consider the following example where $F_{offset}$ is determined by the following equation:

$$F_{offset}(P^{sub}_{SBS}, Rx\_RSS_{SBS}, Target\_RSS_{SBS}, P^{sub}_{TBS}, Rx\_RSS_{TBS}, Target\_RSS_{TBS}) = (P^{sub}_{SBS}[dBm] - P^{sub}_{TBS}[dBm]) - (Rx\_RSS_{SBS}[dBm] - Rx\_RSS_{TBS}[dBm]) + (Target\_RSS_{SBS}[dBm] - Target\_RSS_{TBS}[dBm])$$

Using the estimation for the required output power for transmission to the target base station by applying the relative power control approach as provided by the present invention, allows setting the initial uplink transmission power when the TS is moving from its current base station (SBS) and accesses the Target Base Station (TBS). Thereafter, if there will be some further modifications that will be required to the output power level of the TS' transmitter, such modification may be carried out according to any applicable method known in the art per se.

By yet another example of an embodiment of the present invention, the $F_{offset}$ is determined by using the following equation:

$$F_{offset}(P^{sub}_{SBS}, Rx\_RSS_{SBS}, Target\_SINR_{SBS}, Target\_NI_{SBS}, P^{sub}_{TBS}, Rx\_RSS_{TBS}, Target\_SINR_{TBS}, Target\_NI_{TBS}) = (P^{sub}_{SBS}[dBm] - P^{sub}_{TBS}[dBm]) - (Rx\_RSS_{SBS}[dBm] - Rx\_RSS_{TBS}[dBm]) + (Target\_SINR_{SBS}[dB] - Target\_SINR_{TBS}[dB]) + (Target\_NI_{SBS}[dBm] - Target\_NI_{TBS}[dBm]).$$

Figure 3:
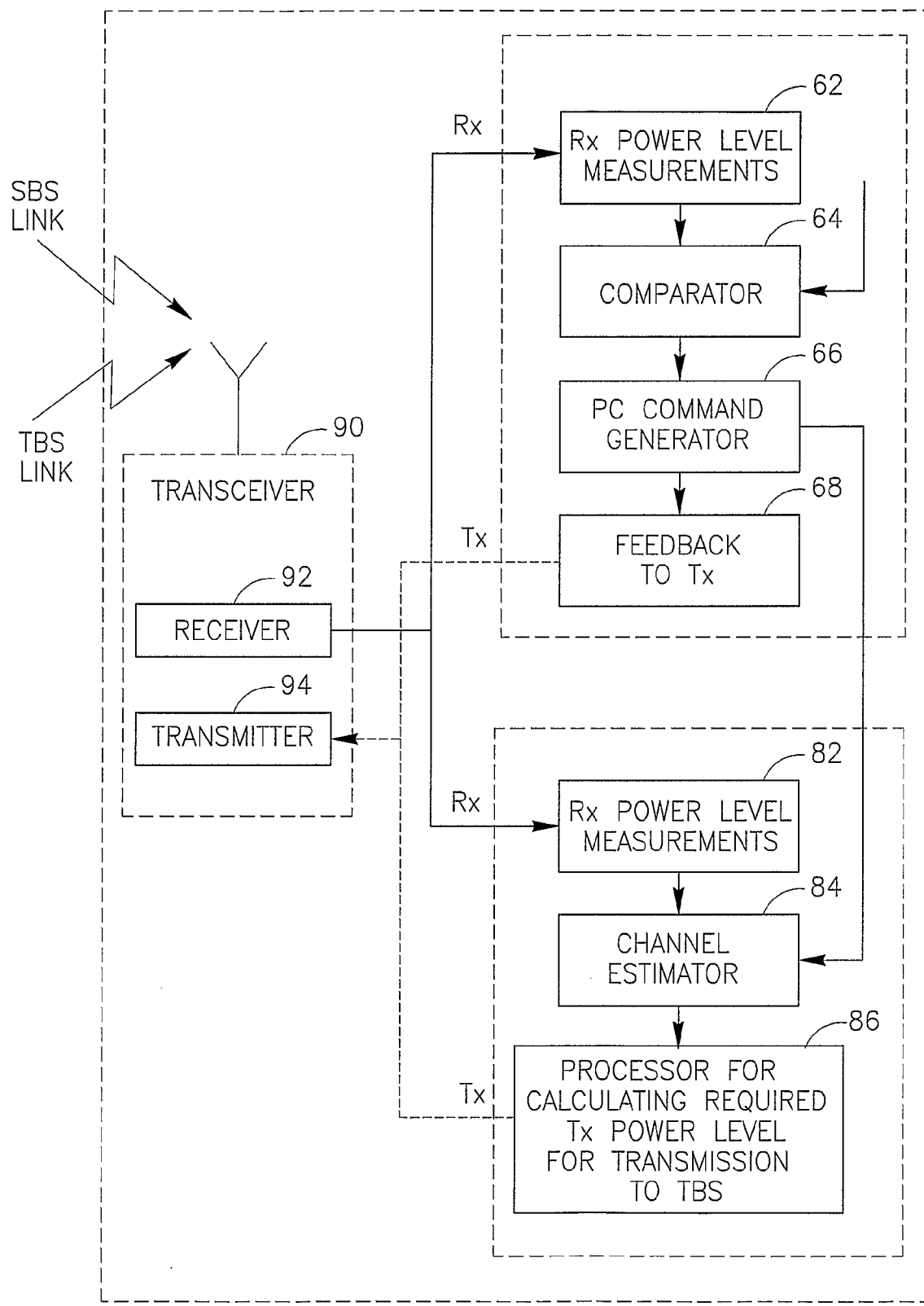
FIG. 3 presents a schematic illustration of power control circuitry constructed in accordance with an embodiment of the present invention.

FIG. 3 presents a schematic illustration of power control circuitry 50 of a mobile terminal constructed in accordance with an embodiment of the present invention. Power control circuitry 50 comprises three main parts, transceiver 90 which comprises receiver 92 and transmitter 94, SBS power control unit 60 which is operative to control the terminal's transmission power when the terminal is communicating with the SBS (the current base station), and TBS power control unit 80 which is operative to control the terminal's transmission power when the terminal would be communicating with the TBS (the base station with which it the terminal is about to start communicating). Receiver 92, receives communications from the SBS, and their power characteristics are measured by SBS Rx power level measuring device 62. The measured results are provided to SBS comparator 64, which compares the measured values with known expected values. The results of the comparator are forwarded to SBS power control generator 66, which provides modification commands whenever it becomes necessary to modify the transmission power level for the terminal in its communication with the SBS. In addition, the information generated by SBS generator 66 is conveyed to TBS channel estimator 84 of power control unit 80. The information generated by SBS generator 66 is used in feedback circuitry 68 that will increase or decrease the power output level for transmitter 94 that is currently communicating with the SBS. Upon triggering a handover process, receiver 92 receives one or more signals from the TBS and forwards these signals to TBS' Rx power level measuring device 82, which measures the power intensity of these signals received from the TBS. The measured results are forwarded to TBS channel estimator 84, and together with the information received from generator 66, provides an estimate of the characteristics of the channel that will be used for communications between the terminal and the TBS. The estimation is provided to processor 86 which calculates the transmission power level that should be used for communicating with the TBS, and set the power control circuitry (not shown) of transmitter 94, accordingly. Upon completing the process, the terminal may start communicating with the TBS.

Figure 4:
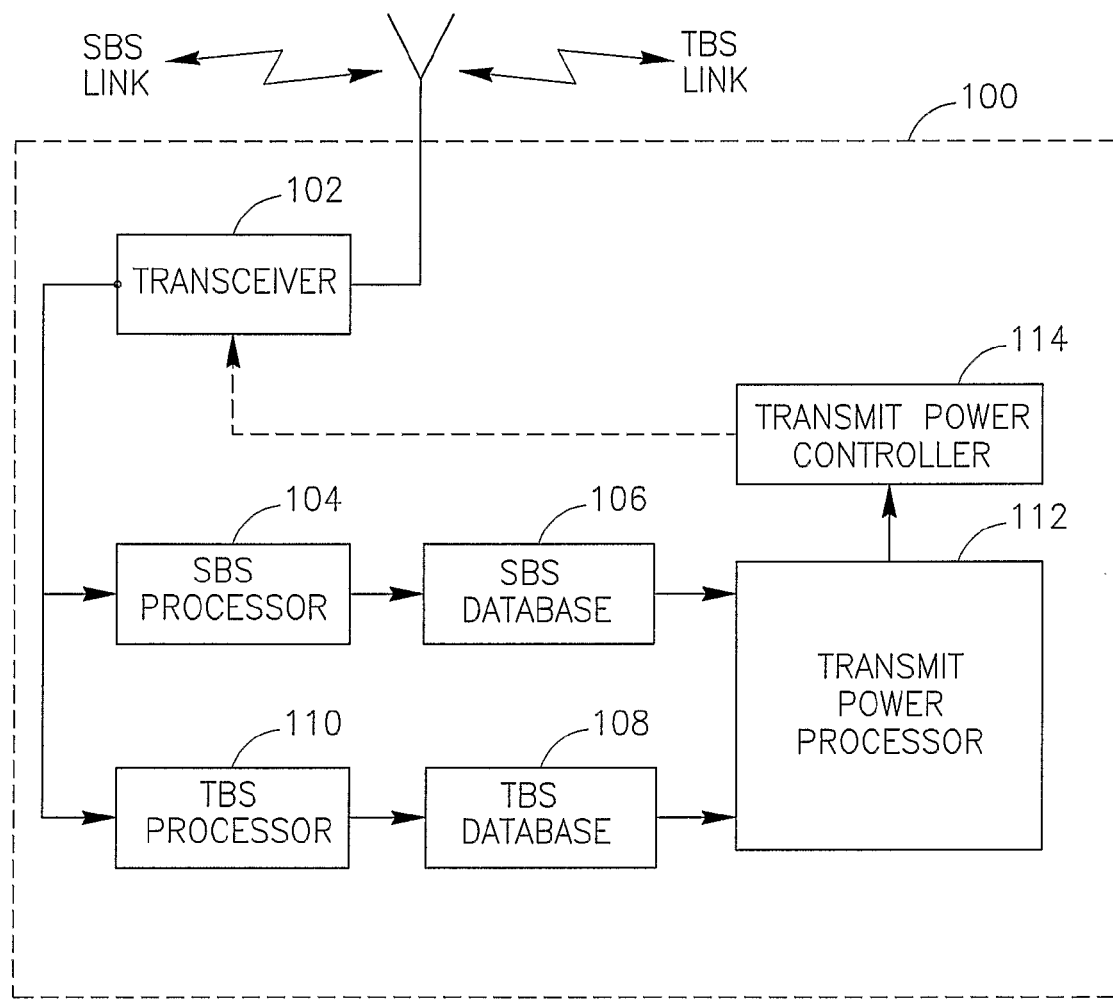
FIG. 4 demonstrates a block diagram of certain components comprised in a mobile terminal according to an embodiment of the present invention.

FIG. 4 demonstrates a block diagram of certain components comprised in a mobile terminal according to an embodiment of the present invention. Mobile terminal 100 comprises a transceiver 102 adapted to communicate with base stations that are operative in the wireless network. From the communications received in transceiver 102 processor 104 retrieves (preferably on a periodic basis) values of pre-defined parameters associated with communications conducted between the mobile terminal and base station with which the mobile terminal is currently communicating, and the retrieved values are stored in storing means 106. When a process of switching to another base station is about to take place, one or more signals are received at the transceiver 102 from the new base station and processor 110 then retrieves the values of certain pre-defined parameters associated with the new base station, with which said mobile terminal is about to start communicating, for example parameters that are associated with the estimation of the channel that will be used for communication between the mobile terminal 100 and the second base station. The values of the parameters associated with communicating with each of the two base stations, namely the SBS and the TBS, are stored in the storing means, e.g. database 106 and 108 respectively. Processor 112 then calculates the transmission power level required for communicating with the second base station which in return allows power control circuitry 114 to initiate a modification of the transmission power level if transceiver 102 is used to communicate with the second base station, or set the initial values if another transmitter will be used for that purpose.

It will be appreciated that the above-described methods may be varied in many ways, including, changing the order of steps, and the exact implementation used.

The present invention has been described using non-limiting detailed descriptions of preferred embodiments thereof that are provided by way of example and are not intended to limit the scope of the invention. It should be understood that features described with respect to one embodiment may be used with other embodiments and that not all embodiments of the invention have all of the features shown in a particular figure. Variations of embodiments described will occur to persons of the art. Furthermore, the terms "comprise," "include," "have" and their conjugates, shall mean, when used in the claims, "including but not necessarily limited to." The scope of the invention is limited only by the following claims:

The invention claimed is:

1. A method for adapting a transmission power level of a mobile terminal being in communication with a first base station during a handover process following which said mobile terminal will be communicating with a second base station, wherein said method comprises measuring at said mobile terminal one or more pre-defined operating parameters that characterize said first base station and storing their updated values within a storage means of said mobile terminal; adapting said transmission power level of said mobile terminal to an acceptable level at which communications transmitted from said terminal to said second base station would be properly received without applying further increase in the transmission power level of the mobile terminal; and wherein said communications transmitted to said second base station will not cause severe interference to communications exchanged between said second base station and other terminals communicating therewith, and wherein the step of adapting said transmission power level to an acceptable level is based on: (a) values of the operating parameters that characterize said first base station which are stored within the storage means of said mobile terminal, and (b) values of one or more pre-defined parameters characterizing said second base station as measured by said mobile terminal.

2. The method according to claim 1, and comprising the steps of:
(i) at said mobile terminal measuring one or more pre-defined characterizing parameters associated with the operation of said first base station;
(ii) storing the values of said one or more pre-defined parameters associated with the operation of said first base station;
(iii) retrieving values of one or more predefined parameters associated with the operation of said second base station, from communications received at said mobile terminal;
(iv) calculating at said mobile terminal a required modification in the transmission power level of said terminal for communicating with said second base station; and
(v) setting the terminal's transmission power level in accordance with the determination made in step (iv).

3. The method according to claim 2, wherein step (iv) comprises a step of: determining whether a modification is required prior to calculating the required modification at said mobile terminal.

4. The method according to claim 2, and wherein said pre-defined parameters associated with said first base station are one or more members of the group consisting of: power control parameters associated with said first base station and parameters characterizing the status of a communication link extending between said first base station and said terminal.

5. The method according to claim 2, and wherein said pre-defined parameters associated with said second base station are one or more members of the group consisting of: power control parameters associated with said second base station; parameters characterizing the status of a communication link extending between said second base station and said terminal; and power control offset parameters.

6. The method according to claim 1, further comprising a step of: applying parameters associated with power offset associated with communications exchanged between said mobile terminal and said first base station for adapting said power transmission level of said mobile terminal.

7. The method according to claim 1, and wherein the one or more pre-defined parameters characterizing said second base station as received by said mobile terminal, are retrieved from communications received at said mobile terminal.

* * * * *